United States Patent [19]
Hutchings et al.

[11] Patent Number: 5,151,488
[45] Date of Patent: Sep. 29, 1992

[54] LIQUID CRYSTAL POLYMERS CONTAINING A REPEATING BISOXAZOLE STRUCTURE

[75] Inventors: David A. Hutchings, Tucker, Ga.; Richard L. Brandon, Chillicothe, Ohio

[73] Assignee: The Mead Corporation, Dayton, Ohio

[21] Appl. No.: 790,558

[22] Filed: Nov. 12, 1991

[51] Int. Cl.⁵ .............................................. C08G 73/22
[52] U.S. Cl. ..................................... 528/179; 528/183
[58] Field of Search ................................ 528/179, 183

[56] References Cited

U.S. PATENT DOCUMENTS

| | | | |
|---|---|---|---|
| 4,423,202 | 12/1983 | Choe | 528/183 |
| 4,439,578 | 3/1984 | Kim et al. | 524/538 |
| 4,606,875 | 8/1986 | Chenevey et al. | 264/85 |
| 4,703,103 | 10/1987 | Wolfe et al. | 528/179 |
| 4,772,678 | 9/1988 | Sybert et al. | 528/179 |
| 4,847,350 | 7/1989 | Harris | 528/179 |
| 4,886,873 | 12/1989 | Mukai et al. | 528/353 |
| 4,898,924 | 2/1990 | Chenevey et al. | 528/183 |

Primary Examiner—Maurice J. Welsh
Assistant Examiner—Rachel Johnson
Attorney, Agent, or Firm—Thompson, Hine and Flory

[57] ABSTRACT

A novel liquid crystal polymer comprising repeating units having the structure (I):

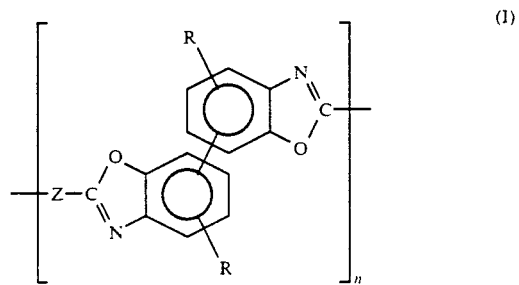

and a method for preparing such liquid crystal polymer are described.

18 Claims, No Drawings

LIQUID CRYSTAL POLYMERS CONTAINING A REPEATING BISOXAZOLE STRUCTURE

BACKGROUND OF THE INVENTION

1. Field of the Invention

The present invention relates to novel liquid crystal polymers having a high degree of rigidity, and to a process for preparing such polymers.

2. Description of the Prior Art

Liquid crystal polymers are well-known in the art. These polymer exhibit anisotropy in the liquid phase. They may be characterized as thermotropic (i.e., liquid crystal in the melt), or lyotropic (i.e., liquid crystal in solution). Liquid crystal polymers are further characterized as having very stiff, rod-like molecules. In the quiescent state, the molecules align themselves in an ordered array in local regions forming domains. The individual domains, on the other hand, exhibit completely random orientations.

As a result of their ability to form anisotropic solutions, liquid crystal polymers can be spun into fibers in which the polymer molecules are highly oriented in the fiber length direction. This orientation begins in the liquid states and results in the unusual property of lower viscosity at higher concentrations.

A number of liquid crystal polymers have been described in the prior art. For example, U.S. Pat. No. 4,772,678 to Sybert et al. teaches a process of the preparation of novel liquid crystalline extended chain polymer-strong acid compositions capable of being drawn through long air gap distances and spun at exceptionally high spin draw ratios. Fibers, film and other articles formed from these liquid crystalline compositions exhibit exceptionally high physical and heat resistant properties. Disclosed is reaction of a monomer having the general structure

with a strong phosphoric acid such as polyphosphoric acid (PPA) to produce the liquid crystal polymer. These monomers are only two of a vast number of disclosed monomers.

U.S. Pat. No. 4,703,103 to Wolfe, et al. is assigned to CommTech International Management Corporation as is the above U.S. Pat. No. 4,772,678 and relates to a similar process and composition wherein the molecular weight as characterized by intrinsic viscosity is controlled.

Specific examples of heterocyclic liquid crystal polymers and processes for preparing such polymers are disclosed in U.S. Pat. Nos. 4,439,578; 4,606,875; 4,847,350; 4,886,873; and 4,898,924. Polyparaphenyleneterephthamide which is available commercially under the trademark KEVLAR ® and processes for preparing the same are disclosed in U.S. Pat. Nos. 3,006,899; 3,063,966; 3,094,511; 3,232,910; 3,414,645; 3,673,143; 3,748,299; 3,836,498; and 3,827,998, among others.

Liquid crystal polymers having a bisoxozal-containing biphenol structure in which the oxazole rings extend from separate phenyl nucleic and thereby enhance the "rod-like" nature of the polymer chain and contribute to the rigidity of the polymer is heretofore unknown.

SUMMARY OF THE INVENTION

It is a principal object of the present invention to provide a novel liquid crystal polymer having enhanced rigidity and improved thermal stability.

It is another object of the present invention to provide a process for preparing such liquid crystal polymer.

These and other objects are achieved in accordance with the present invention which, in one embodiment, provides:

A liquid crystal polymer comprising repeating units having the structure (I):

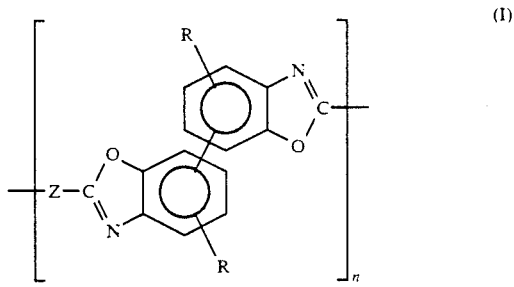

where n is an integer of about 10 to 30; R is an alkyl group of about 1 to 9 carbon atoms, an aryl group of about 6 to 12 carbon atoms, an alkoxy group of about 1 to 4 carbon atoms, an aryloxy group of about 6 to 12 carbon atoms, an alkaryl group of about 7 to 13 carbon atoms, an aralkyl group of about 7 to carbon atoms, or halogen; and Z is an arylene group having about 6 to 12 carbon atoms.

In accordance with this embodiment of the invention, the liquid crystal polymer preferably contains repeating units having the structure (II):

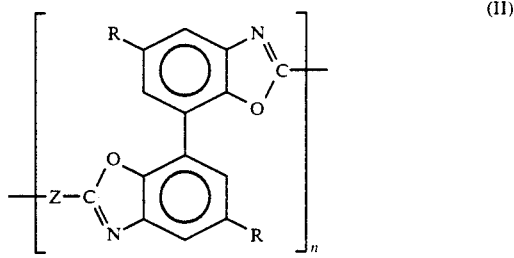

where n, R and Z are defined as above.

More preferably the liquid crystal polymer contains repeating units having the structure (III):

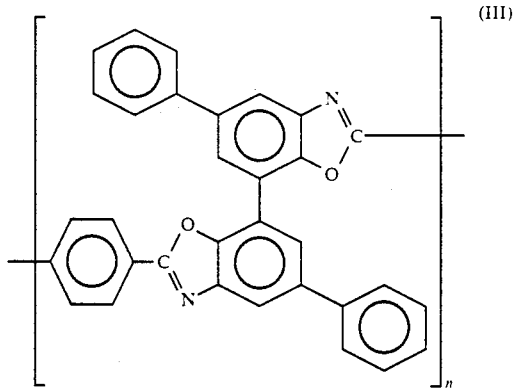

where n is defined as above.

Another embodiment of the present invention related to a process for preparing such liquid crystal polymers.

DETAILED DESCRIPTION OF THE INVENTION

As stated hereinabove, the polymers of the present invention are rigid "rod-like" structures due to the configuration of the polymer chain, and they are further characterized as having high thermo-oxidative resistance and high tensile strength and modulus. Such polymers may be employed as a reinforcement for fiber composite such as used in aerospace vehicles and in other applications where such characteristics are desirable or necessary.

The liquid crystal polymers of the present invention are prepared by reacting a biphenol with a nitrating agent such as nitric acid to incorporate a nitro group onto the phenolic ring in the ortho positions with respect to the hydroxy groups. The nitro-containing biphenol is then reacted with an agent capable of reducing the nitro group to an amino group. Reaction of the aminophenol with terephthalic acid in a strong polyphosphoric acid or other non-reducing acid will produce the liquid crystal polymer of the present invention. The general scheme of the reactions envisioned according to the present invention can be shown by reference to equations 1, 2 and 3 as follows:

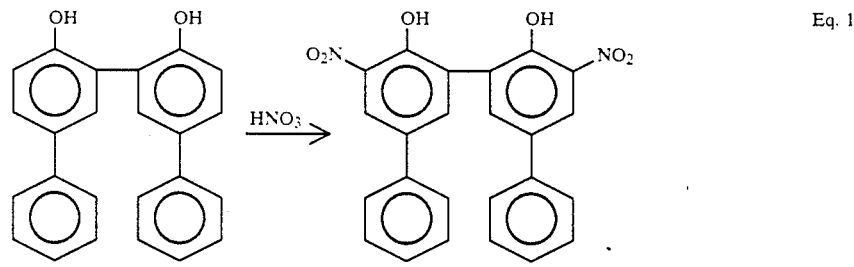

Eq. 1

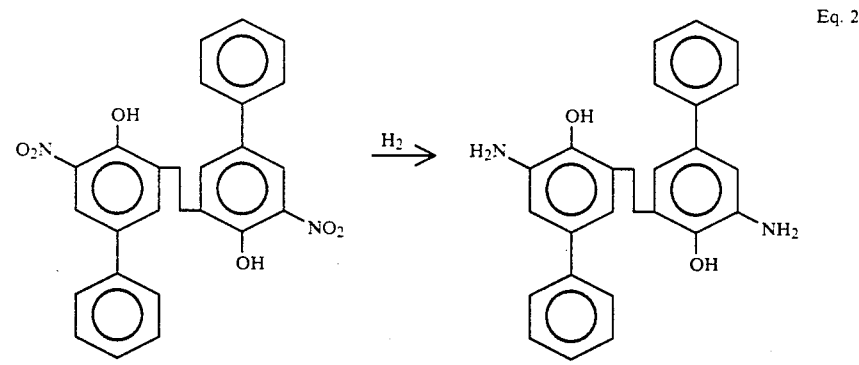

Eq. 2

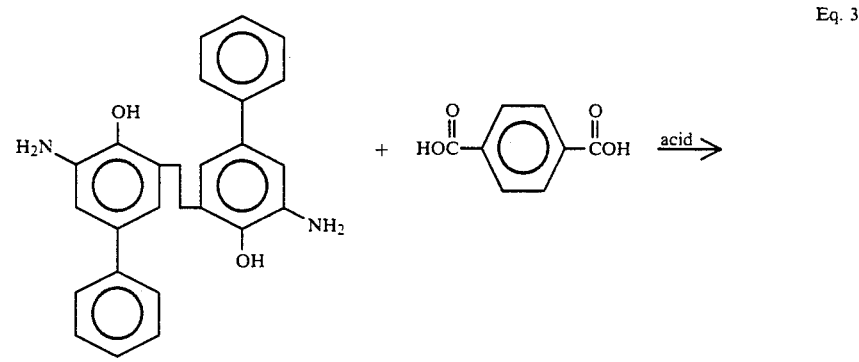

Eq. 3

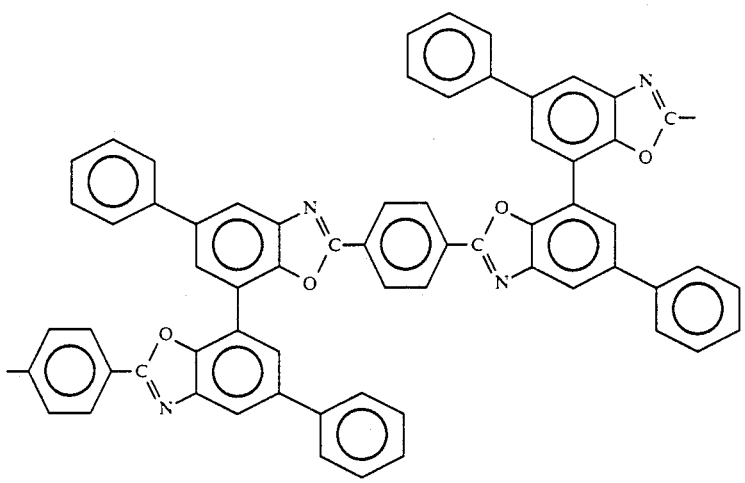

The liquid crystal polymers encompassed by the present invention exhibit special properties such as providing enhanced rigidity and improved thermal stability which make them very useful in the production of various articles such as fibers, films, fibrids, and the like. It is believed that these special properties can be attributed to the novel structure of the polymer chain which contains repeating bisoxazole ring units in which the bisoxazole rings extend from separate phenyl nuclei rather than the same phenyl nucleus as described in U.S. Pat. No. 4,772,678. It is expected that the various substituents such as the pendant p-phenyl group on the polymer backbone can be chosen to aid in processing the polymer by reducing the temperature at which fibers can be formed and also by increasing the solubility of the polymer in the solvent medium. The polymerization can be controlled to provide liquid crystal polymers having a number average molecular weight ($MW_n$) within the range of about 3,000 to 90,000. Preferably the molecular weight is controlled to be within the range of about 4,000 to 50,000 and most preferably between about 5,000 and 40,000.

The biphenols useful in preparing the rigid liquid crystal polymers of the present invention have the structure (IV):

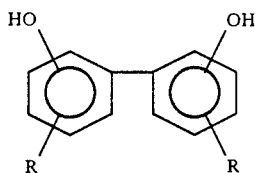
(IV)

where R is described as in structure (I) above.

The preferred biphonels have the structure (V):

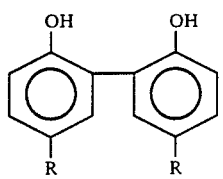
(V)

or (VI):

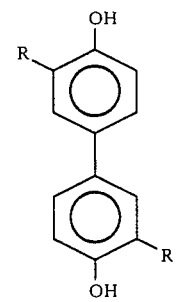
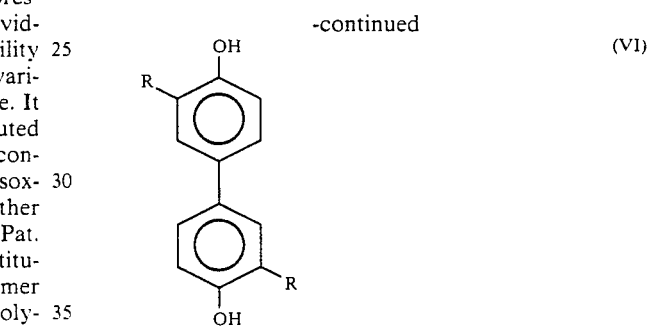
(VI)

where R is defined as in structure (I).

Most preferably the oligomer is the dimer of p-phenylphenol which has the structure (VII):

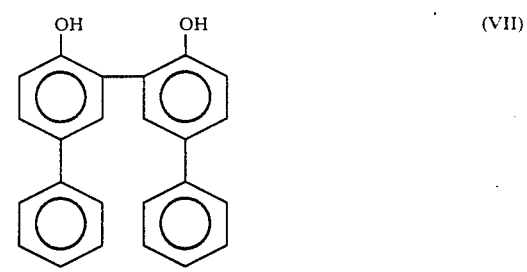
(VII)

The p-phenylphenol dimer is a relatively inexpensive material which can be produced in high yields by enzymatic processes such as that described in U.S. Pat. Nos. 4,647,952 and 4,900,671 both of which are commonly assigned to The Mead Corporation.

Nitration of the oligomer is accomplished by well known procedures. For example, a mixture of nitric acid and sulfuric acid in a ratio of about 1:2 proceeds very well in nitrating the oligomers useful in the present invention. It is believed that the nitration is not brought about by attack of the nitric acid on the oligomer, but by attack of the more electrophilic nitronium ion, $NO_2^+$ which is formed from the nitric acid-sulfuric acid mixture according to the equation:

$$HNO_3 + 2\ H_2SO_4 \rightleftharpoons NO_2^{\oplus} H_3O^{\oplus} + 2HSO_4^{\ominus}$$

The —NO₂ groups can be reduced using hydrogen under pressure in the presence of a suitable catalyst such as Raney nickel. The preferred method of reduction comprises reacting the nitrated phenol with a hydrogen donor such as hydrazine or formic acid in the presence of a palladium on charcoal catalyst.

In another method of reduction, the nitrated phenol is reacted with hydrogen generated by the reaction of a metal such as tin, zinc or iron with a strong acid, e.g., hydrochloric acid.

The preferred aromatic dicarboxylic acid useful in the present invention is terephthalic acid, however, other aromatic dicarboxylic acids such as naphthalene dicarboxylic acid, anthracene dicarboxylic acid and phenanthrane dicarboxylc acid can be employed.

The solvent medium used in preparing the liquid crystal polymers of the present invention is characterized as being a strong non-oxidizing acid. Such acids include polyphosphoric acid; alkanesulfonic acid such as methanesulfonic acid, ethanesulfonic acid, propanesulfonic acid, butanesulfonic acid, pentanesulfonic acid; hexanesulfonic acid; and trifluoromethanesulfonic acid;

The amount of reactants employed in carrying the present invention will vary, however, the amount of the phenolic oligomer will typically range from about 40 mole % to 60 mole % and the amount of the dicarboxylic acid will range from about 60 mole % to 40 mole %.

The polymerization reaction is conducted at a temperature of about 150° C. to 300° C., preferably at about 200° C. to 275° C. The polymerization may be conducted under an inert gas such as nitrogen, argon, carbon dioxide, and the like at pressures up to about atmospheric pressure.

The invention is illustrated in more detail by the following non-limiting examples.

EXAMPLE 1

One hundred grams of a dimer of p-phenylphenol prepared as described in U.S. Pat. No. 4,900,671 is dissolved in four times its weight of sulfuric acid and fifty grams of fuming nitric acid is added dropwise while cooling the reaction mixture. After warming on a steam bath for one hour the dinitro diphenol is recovered by precipitation in an ice-water mixture.

The dinitro diphenol is dissolved in ethanol at 50° C. and a palladium on charcoal catalyst added followed by dropwise addition of 64% hydrazine. The mixture is refluxed for one hour and the diamino diphenol isolated by recrystallization.

EXAMPLE 2a 36.8 grams (0.1 moles), of the diaminodiphenol prepared in Example 1 is reacted with 40.8 grams (0.4 moles) of acetic anhydride in a three necked 250 ml. round bottom flask provided with a mechanical stirrer, a short path condenser and a dropping funnel. The reactor is heated in a sand bath to 160° C. with stirring and product acetic acid is removed and collected. At this point, both the amino and hydroxyl functions are acetylated. Next, 27.4 grams (0.4 moles) of p-aminobenzoic acid are added to the reaction mixture to produce a diamino dioxazole. The reactor is then heated to a maximum temperature of 250° C. until acetic acid is no longer evolved.

The reaction mixture is cooled to 160° C. and an additional 20.4 grams (0.2 moles) of acetic anhydride is added followed by the addition of 16.6 grams (0.1 mole) of terephthalic acid. The reaction mixture is heated to 250° C. and held at that temperature until acetic acid is no longer evolved. The flask is removed from the sand bath and allow to cool. The product is a light tan opaque solid.

At this point, the polymer is capable of producing relatively low strength, clear fibers when melted on a hot plate. 10 grams of the polymer is ground to a particle size capable of passing through a 24 mesh screen. The granular polymer is heated in an oven under nitrogen and the temperature slowly raised to 290° C. and held for 16 hours. When the resulting polymer is heated on a spatula using a hot plate and stirred with a glass rod, opalescence is observed indicating a highly oriented polymer system in its liquid crystal mesophase.

Fibers are hand drawn from the melt and heat treated on aluminum plates at a maximum temperature of 320° C. for 12 hours. Fibers are tested at a gauge length of 1 inch and produce an average tensile strength of 24.2 gpd (average 10 pulls). The average tensile modulus is 380 gpd.

EXAMPLE 2b

Using the procedure described in 2a, p-hydroxy benzoic acid is substituted for the p-amino benzoic acid to produce a dihydroxy dioxazole. Acetylation of the dioxazole results in a monomer which can be reacted with terephthalic acid via transesterification to yield a polyester capable of being solid state polymerized to a system showing thermotropic liquid crystallinity, i.e., a high degree of stir opalescence. The system produces high strength, high modulus fibers after heat treatment.

EXAMPLE 2c

A portion of the acetylated dihydroxy diamine described in Example 2a is reacted directly with terephthalic acid to produce a polyphenyl benzoxazole which can be polymerized to a high molecular weight. The system forms a strong polymer on solidification and appears well suited for high temperature applications.

EXAMPLE 2d

The dihydroxy dioxazole described in Example 2b is incorporated into a liquid crystal polymer having the following molar composition:

| Component | Moles |
| --- | --- |
| p-hydroxybenzoic acid | 12 |
| Terephthalic acid | 4 |
| Dihydroxy dioxazole | 4 |

The performance of this material is compared with a similar polyester polymer derived from monomers combined in the following molar ratio:

| Component | Moles |
| --- | --- |
| p-hydroxybenzoic acid | 12 |
| Terephthalic acid | 4 |
| p,p'-dihydroxybiphenyl | 4 |

Both polymers are prepared using the transesterification of acetates described in Example 2a. As shown in Table I, the polymer prepared using the dihydroxy dioxazole shows improved melt processability and greatly improved tensile molding performance (Dogbone test using a Mini-max injection molder) over the polymer prepared using the dihydroxy biphenyl.

TABLE I

| Component | Tensile Strength |
|---|---|
| Dihydroxy dioxazole | 35 Kpsi |
| Dihydroxy biphenyl | 20 Kpsi |

Having described the invention in detail and by reference to preferred embodiments thereof, it will be apparent that modifications and variations are possible without departing from the scope of the invention defined in the appended claims.

What is claimed is:

1. A liquid crystal polymer having a structure comprising repeating units selected from the group consisting of

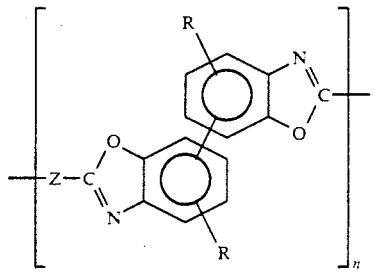

(I)

where n is an integer of about 10 to 30; R is an alkyl group of about 1 to 9 carbon atoms; an aryl group of about 6 to 12 carbon atoms; an alkoxy group of about 1 to 4 carbon atoms; an aryloxy group of about 6 to 12 carbon atoms, an alkaryl group of about 7 to 13 carbon atoms, an aralkyl group of about 7 to 13 carbon atoms, or halogen; and Z is an arylene group having about 6 to 12 carbon atoms.

2. The liquid crystal polymer in claim 1 wherein said repeating units comprise the structure (II):

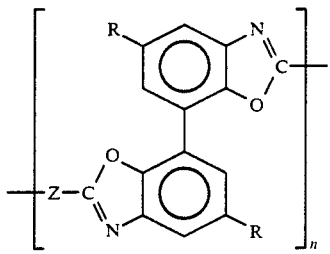

(II)

where n, R, and Z are defined as in claim 1.

3. The liquid crystal polymer of claim 2 wherein said repeating units comprise the structure (III):

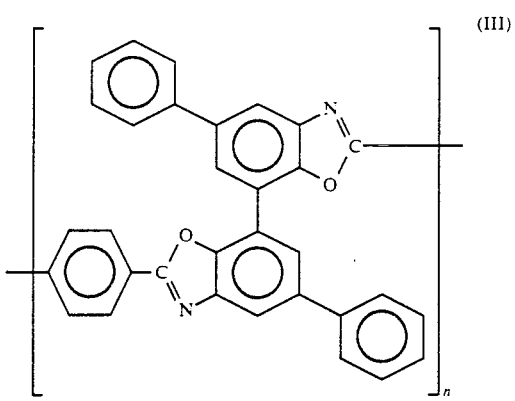

(III)

where n is defined as in claim 1.

4. The liquid crystal polymer of claim 3 where said polymer has a number average molecular weight of about 3,000 to 90,000.

5. A process for the production of a liquid crystal polymer comprising the steps of:
   (1) reacting a phenolic compound in the presence of a nitrating agent to introduce —NO₂ groups onto the phenolic ring in the ortho position with respect to the —OH group,
   (2) reducing said —NO₂ groups with a reducing agent to form —NH₂ groups in said ortho position,
   (3) polymerizing the reaction product of step (2) with an aromatic dicarboxylic acid; and
   (4) recovering said liquid crystal polymer.

6. The process of claim 5 wherein said phenolic compound is a diphenol having the structure (IV):

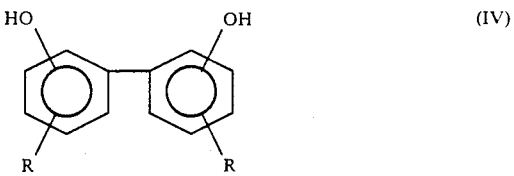

(IV)

where R is an alkyl group of about 1 to 9 carbon atoms; and aryl group of about 6 to 12 carbon atoms; an alkoxy group of about 1 to 4 carbon atoms; an aryloxy group of about 6 to 12 carbon atoms, an alkaryl group of about 7 to 13 carbon atoms, an aralkyl group of about 7 to 13 carbon atoms, or halogen.

7. The process of claim 6 wherein said diphenol is a dimer of p-phenylphenol, said p-phenylphenol dimer having the structure (VII):

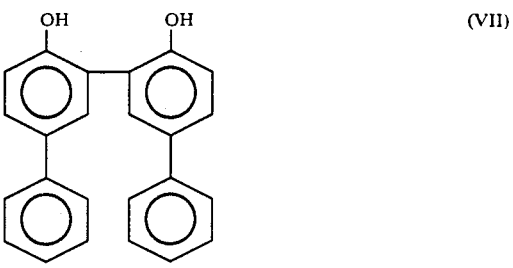

(VII)

and said liquid crystal polymer comprises the repeating units having the structure (III):

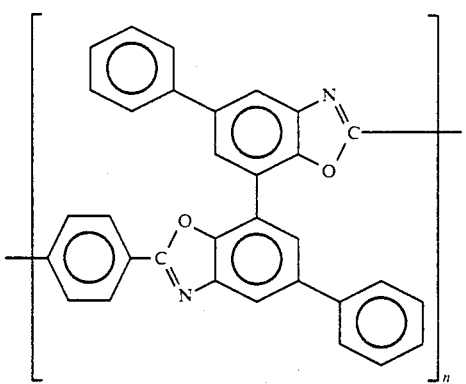

(III)

where n is an integer of about 10 to 30.

8. The process of claim 5 wherein said polymerizing step (3) further comprises a non-oxidizing acid as solvent.

9. The process of claim 8 wherein said non-oxidizing acid is polyphosphoric acid.

10. The process of claim 6 wherein said liquid crystal polymer has a number average molecular weigh of about 3,000 to 90,000.

11. The process of claim 7 wherein said dimer of p-phenylphenol is prepared by an enzymatic reaction which comprises reacting p-phenylphenol with a peroxidase enzyme and a peroxide or an oxidase enzyme and oxygen in an organic containing medium.

12. The process of claim 6 wherein said reaction is carried out at a temperature of about 150° to 300° C.

13. The process of claim 6 wherein said reaction is carried out at a pressure up to about atmospheric.

14. The process of claim 6 wherein said reaction is carried out in the presence of an inert gas.

15. The process of claim 14 wherein said inert gas is nitrogen.

16. The process of claim 6 wherein said nitrating agent is nitric acid.

17. The process of claim 6 wherein said reducing agent is hydrogen.

18. The process of claim 6 wherein said aromatic dicarboxylic acid is terephthalic acid.

* * * * *